United States Patent [19]
Harsock et al.

[11] Patent Number: 6,036,097
[45] Date of Patent: Mar. 14, 2000

[54] CARD READER WITH SECURITY GATE

[76] Inventors: Leonard Harsock, 4172 W. 147th St., Lawndale, Calif. 90260; Jerry Parsons, 1804 E. 215th St., Carson, Calif. 90745

[21] Appl. No.: 09/012,078

[22] Filed: Jan. 22, 1998

[51] Int. Cl.$^7$ .......................... G06K 13/00; G06K 13/06
[52] U.S. Cl. ............................................ 235/475; 235/483
[58] Field of Search ................................... 235/475, 483; 194/351, 210

[56] References Cited

U.S. PATENT DOCUMENTS 3,766,687  10/1973  Henson ........................................ 49/35
3,995,728  12/1976  Kerby ....................................... 194/4 D

*Primary Examiner*—Thien M. Le
*Assistant Examiner*—Daniel H Sherr
*Attorney, Agent, or Firm*—Edward Dreyfus

[57] ABSTRACT

A transaction card reader for manually inserted cards includes a vertically moveable gate located just inward of the card insertion opening. The gate is moved from its closed or blocking position in response to the leading card edge engaging and applying symmetrical lifting forces to the gate. Guide members guide the vertical gate movement if the card is oriented at the correct angle in the insertion plane to produce symmetrical lifting forces. These guide members impede the gate from moving from its closed position if one card leading edge portion engages the gate before the other. In one exemplary embodiment, the gate includes a pair of spaced cam surfaces facing the user. If the leading card edge engages one cam surface before the other, the gate will skew and bind in a gateway. If both cam surfaces are engaged substantially simultaneously, the gate rises vertically in the gateway. A gate spring symmetrically biases the gate member toward the closed position.

14 Claims, 7 Drawing Sheets

CARD READER WITH SECURITY GATE

BACKGROUND

The present invention relates to card readers and more particularly to credit, cash, smart or other transaction card readers that require the card insertion slot to reject materials other than cards and require good card orientation during initial insertion.

Conventional transaction card readers are well known and include a variety of types and designs including full and partial card insertion to the position in which the card is read and manual insertion or automatic/motor assisted insertion. In each of these, various internal reader elements, such as grooves, channels, moving trays, etc. are provided with a purpose of orienting and guiding the card to a proper reading position. The technical problems associated with this function have become more serious with, for example, the growth of ISO smart cards having extremely small dimensions and tolerances for contacts or pads and other elements of the card and reader. In addition, many of these cards are partially inserted to the reading position and manually inserted and withdrawn from the reader giving rise to the need for proper and more precise card orientation and direction at the time of initial manual insertion.

In addition, conventional readers include elements to block the reader mouth or insertion slot. These elements function to block debris from entering the reader and to block tamper tools from entering the reader. These elements normally include hinged doors or slide gates that block the reader opening and that manually or automatically move to allow entry in response to the presence of a card regardless of card orientation.

SUMMARY OF EXEMPLARY EMBODIMENTS OF THE PRESENT INVENTION

The card reader, according to the principles of the present invention, includes in combination a new type of gate assembly located at the reader mouth which enables card insertion only when the card is properly oriented by the user and inserted correctly. According to one exemplary embodiment, the gate assembly includes gate material that blocks the entire mouth of the reader but is moveable vertically in a shaft, channel, or gateway located slightly inward of the mouth. The gate includes a front (user facing) ramp or cam surface at each side of the gate. When a card leading edge is properly inserted so that the edge engages both ramps at the same time, the manual card insertion forces the gate upward thus opening the mouth for further card insertion into the reader interior. If the card leading edge first contacts only one of the ramps due to improper orientation, then the gate will skew in the gateway and not rise from its blocking position.

In a preferred embodiment, the force applied to lift the gate arises from the manual insertion of the card. The gate lowers to the closed position automatically due to gravitational and spring forces upon withdrawal of the card from the reader. Thus, no motors or other mechanisms are required for automatic gate operation.

A further function provided by the gate includes protecting the reader internal elements from vandalism, tampering, dirt and debris.

DESCRIPTION OF DRAWINGS

Other and further benefits and advantages will become apparent from the following detailed description of an exemplary embodiment when taken in view of the appended drawings, in which.

DETAILED DESCRIPTION OF EXEMPLARY EMBODIMENT

Figure 1:
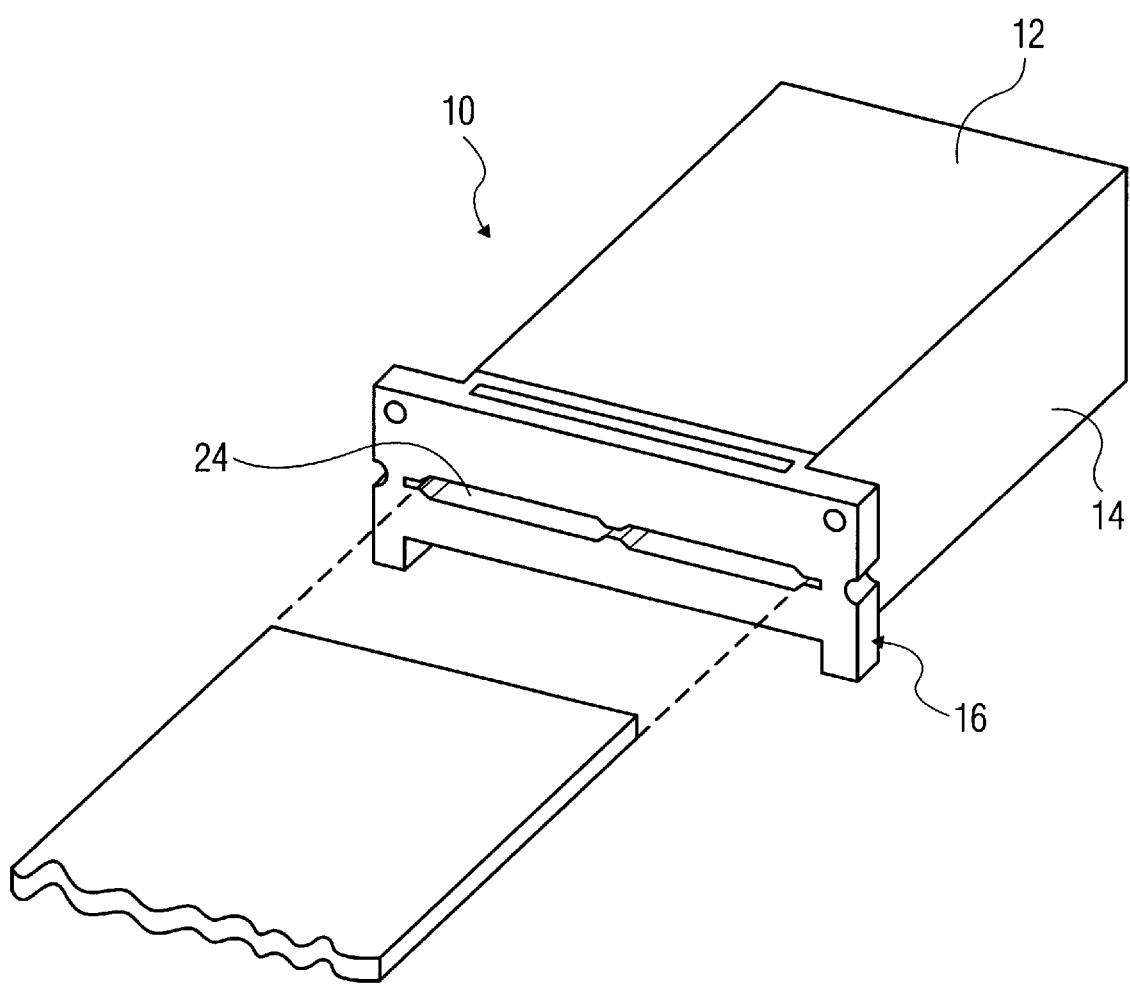
FIG. 1 is a pictorial perspective view of one exemplary card reader according to principles of the present invention.

With reference to the drawings, card reader 10 according to the principles of the present invention includes a suitable circuit board or cover 12, a longitudinal frame 14 with transverse front plate member 16. Standard mounting holes 18 and notches 20 can be provided in member 16 for mounting reader 10 to the front plate of an ATM or other transaction apparatus, not shown.

Figure 9:
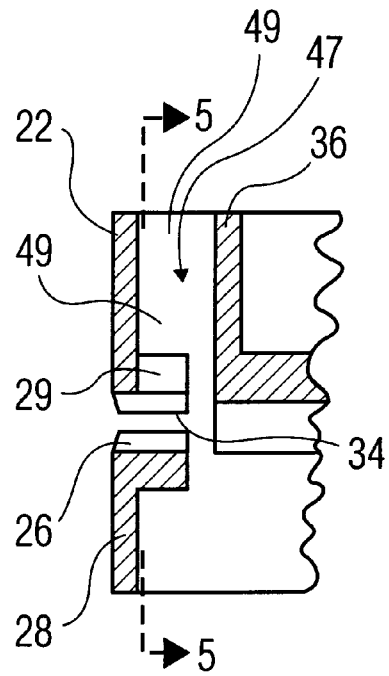
FIG. 9 is a vertical section taken along line 9—9 of FIG. 2 without the gate member and the gate spring shown.

As better seen in FIGS. 3, 4, 5, and 10, front plate member 16 includes a front, user facing plate 22 that defines a transverse card opening 24 the edges of which are bevelled at 26 to aid in the proper vertical alignment of the card edge. In one exemplary embodiment, each bevelled surface lies approximately 75° from the horizontal card insertion plane through opening 24. Plate 22 also includes mutually facing card guides 28 and 30 located near the transverse ends of opening 24 and, preferably, one pair of mutually facing guides 32 and 34 located in the central region of opening 24. These guides are spaced vertically from each other a precise distance and are transversely aligned to precisely position and guide the leading card edge as it traverses opening 24. Guides 28, 30, 32, 34 are elongated and extend from plate 22 inward as better seen in FIG. 9. The transverse side edges of opening 24 defined by plate 22 are also precisely determined to guide the lateral position of the card to a precise lateral position upon entering the reader. These transverse side edges of opening 24 can also be bevelled to aid in the lateral positioning of the leading card edge. The inward side of front plate 22 forms an elongated shoulder or resting element 29 (see FIGS. 5 and 9) for supporting the gate member when in its closed or blocking position as described below.

Frame 14 further includes a rear gateway plate 36 that serves as the back wall to the gateway and confines the gate member movement in the vertical direction. Opening 24 as well as the respective guides and transverse edges are precisely aligned in the longitudinal direction to guide the card precisely as it travels toward its intended seated or reading position within the reader. Other guides and channels (not shown) can be provided further inward of the gateway to further guide the card toward its fully seated position.

Plates 22 and 36 can be formed of hard plastic, metal or other suitable material. Plates 22 and 36 are longitudinally spaced from each other to form a cavity or gateway 47 that includes vertical side walls 49 that cooperate with the gate member 46 as described below. An elongated gate member 46 is positioned transversely in the gateway for vertical movement as described below. Gate 46 includes an elongated L-shaped body 48 having a vertical downward facing leg 50 that functions as the gate and a horizontal forward facing leg 52 that functions as a seating member with seating surface 53. Gate member 46 further includes end pieces 54 each of which define a lower cam surface 56 extending upwardly and forwardly toward opening 24 when in position with slots 25 located between shoulder 29 and gateway end walls 49. End pieces 54 preferably have lower ends 58 that are rounded and extend slightly below the bottom edge 60 of leg 50. Gate member 46 can be made of hard plastic, metal or other suitable material and, have a cam surface at any suitable angle, however, in one embodiment a 38° cam surface angle has been found suitable.

Gate member 46 installs into gateway through an opening in the top of plate member 16. Member 46 drops downward until seating surface 53 rests on shoulder 29 at which position, leg 50 completely blocks opening 24. See FIG. 10. The gateway and gate member 46 are mutually dimensioned to enable member 46 to ride vertically. However, the tolerances are such that vertical lifting forces on member 46 must be symmetrically applied around the center fore and aft axis of member 46 in order to raise the gate. If asymmetrical lifting forces are applied, then, because of the close fit in the gateway, member 46 will skew and bind in the gateway, thus impeding vertical member 46 movement.

Figure 2:
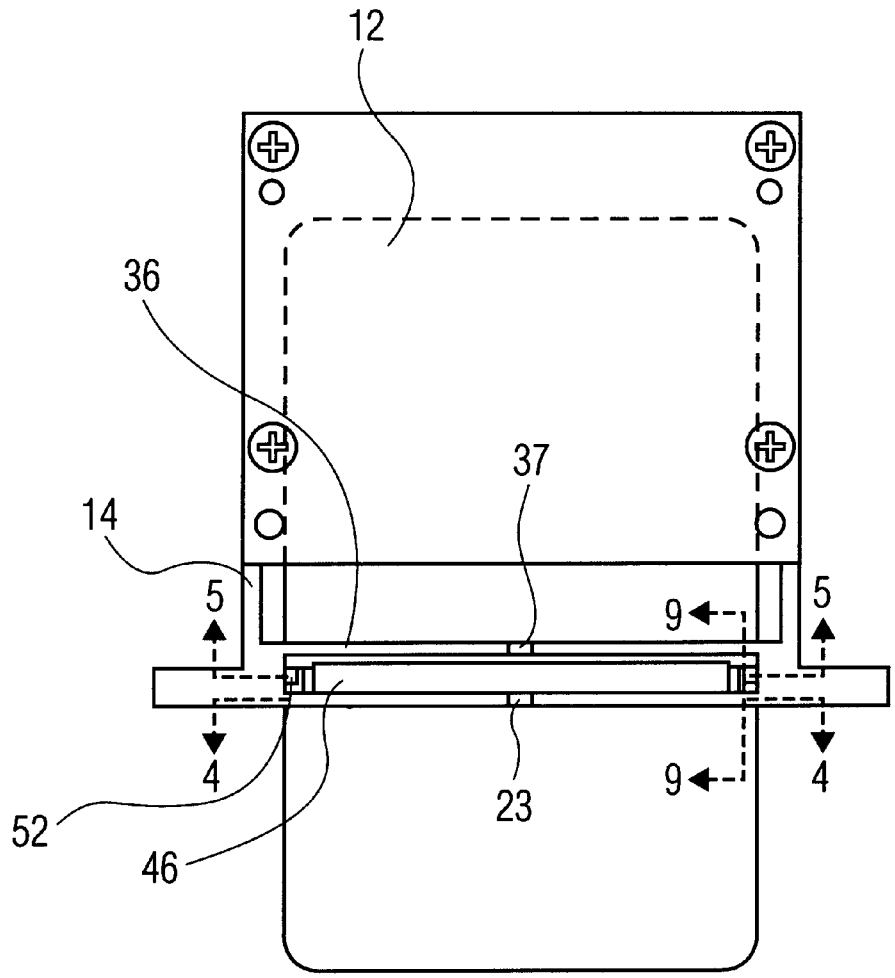
FIG. 2 is a top view of the reader of FIG. 1 with a card inserted to the reading position.
Figure 3:
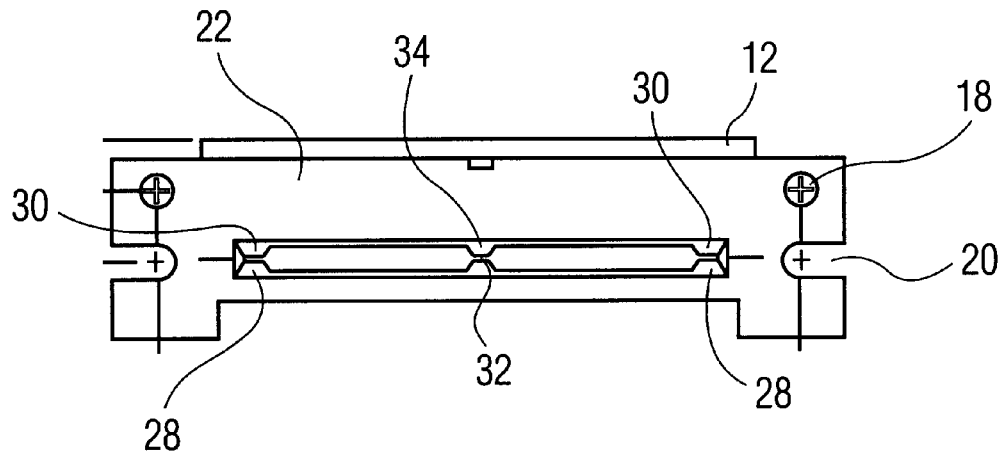
FIG. 3 is a front view of the reader of FIG. 2 without an inserted card.
Figure 4:
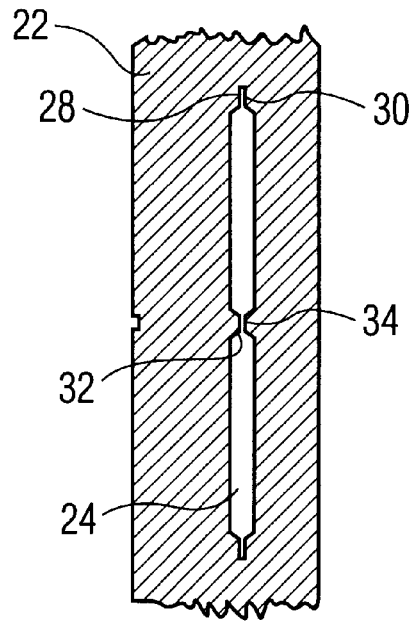
FIG. 4 is a vertical section view taken along line 4—4 of FIG. 2 without the gate member shown.
Figure 5:
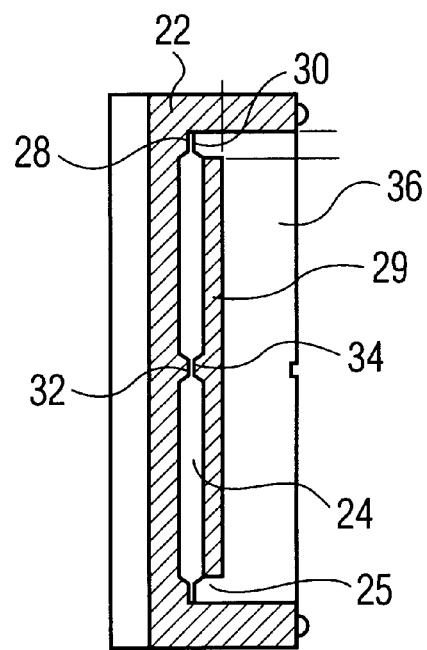
FIG. 5 is a vertical section view taken along 5—5 of FIG. 9.
Figure 6:
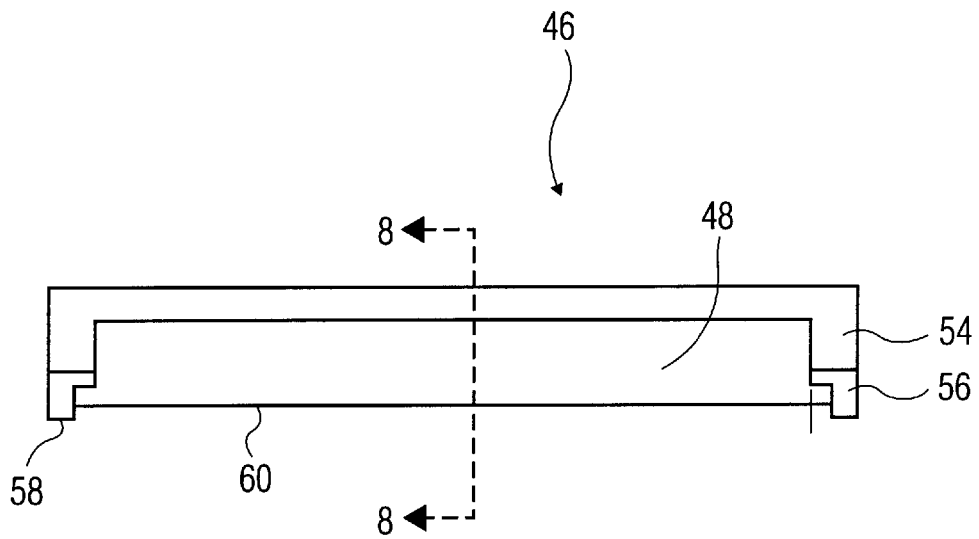
FIG. 6 is a front elevation of a gate member of the reader shown in FIG. 1.
Figure 7:
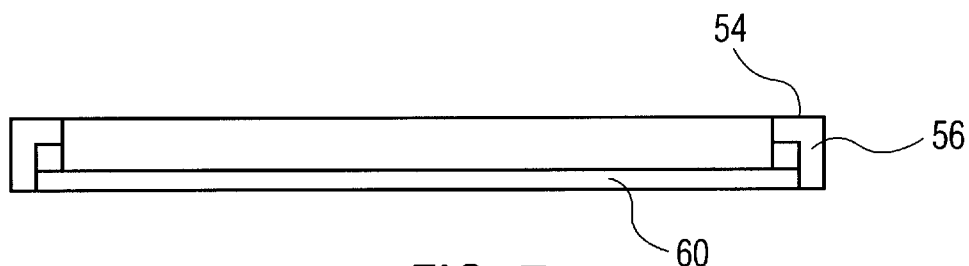
FIG. 7 is a bottom view of the gate member of FIG. 6.
Figure 8:
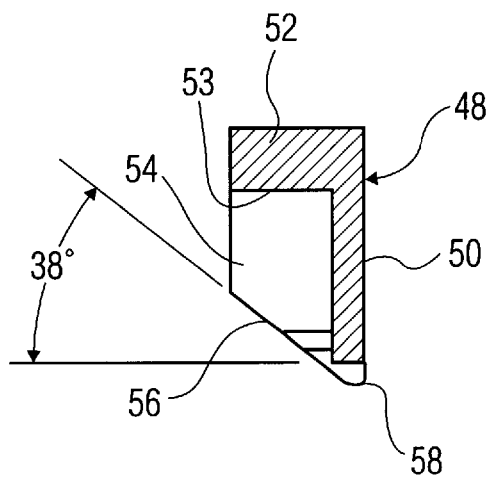
FIG. 8 is a vertical section taken along line 8—8 of FIG. 6.
Figure 13:
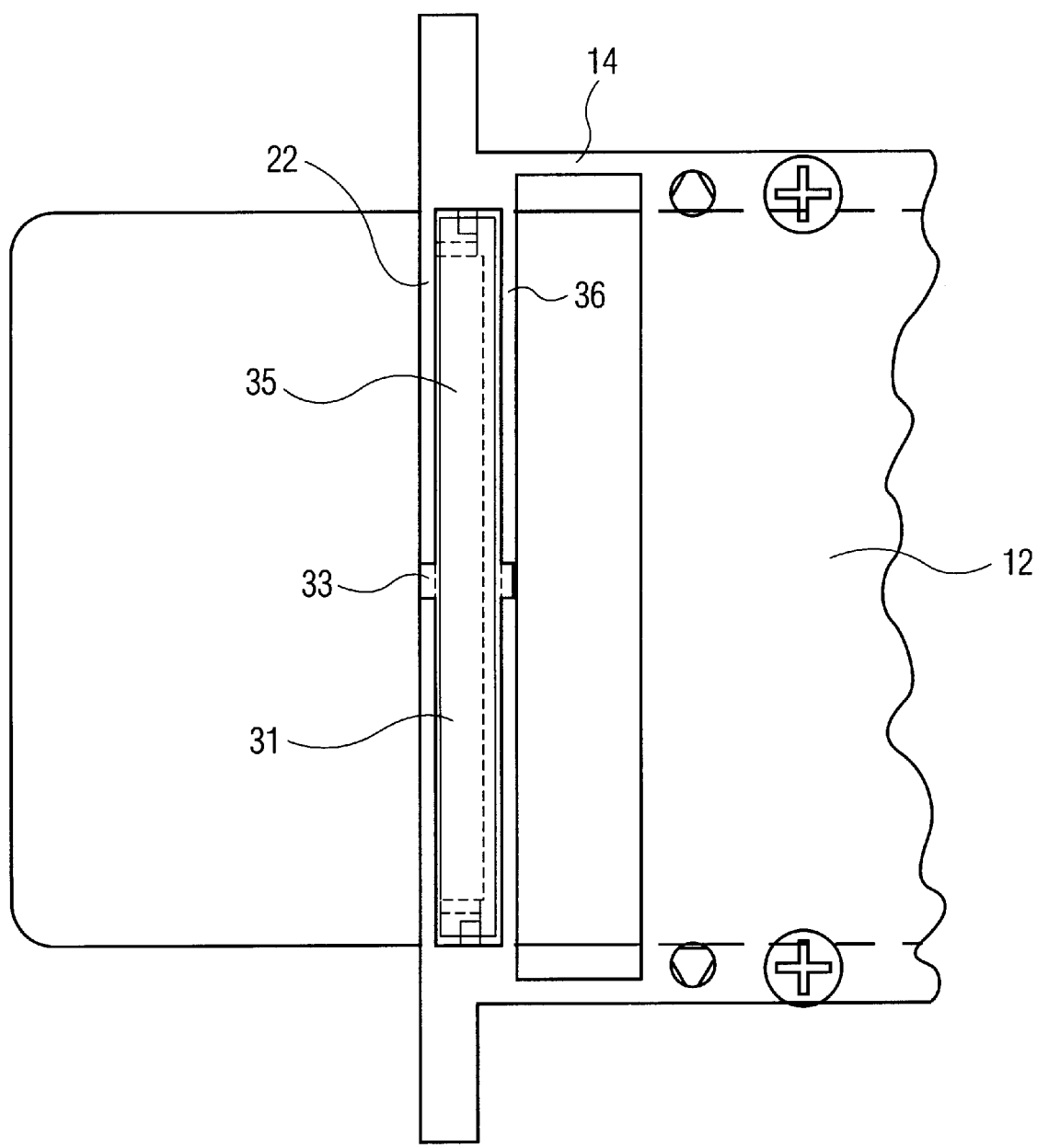
FIG. 13 is similar to FIG. 2 with the gate spring in place.

Plates 22 and 36 form at their mid-regions gate spring retaining recesses 23 and 37 better seen in FIG. 2. Metal gate spring, such as leaf type gate spring 31 includes a pair of wings 33 which can be pressed into recesses 23 and 37 to secure gate spring 31 therein. See FIGS. 10 and 13. This form of securement is typically termed a press or interference fit. Spring 31 includes a pair of legs 35 that descend outward and downward from wings 33 and contact the top of opposite side ends of gate member 46. Spring 31 functions to mechanically bias gate member 46 downward toward its closed position, but spring legs 35 flex upward but with greater downward bias in response to the upward movement of gate member 46. The biasing forces applied by Spring 31 should be symmetrically applied to gate member 46 side ends about the fore and aft axis of gate member 46.

In operation, with reader 10 mounted in an ATM or other transaction apparatus, not shown, gate member 46 is in its closed or down position with resting surface 53 resting on shoulders 29. Gate 50 completely blocks the back side of opening 24 to prevent tamper tools or debris from entering the reader housing.

A user then inserts the leading edge of a transaction card through opening 24. Bevelling 26 and guides 28, 30 and 32, 34 assure the proper vertical position of the card leading edge and the side walls of opening 24 assure the proper transverse position of the leading edge.

If the card is properly angularly oriented in the horizontal plane then the opposite transverse side portions of the leading card edge engage both cam surfaces 56 substantially simultaneously. The manual rearward card force then equally applies to each cam surface 56 to raise gate member 46 and to compress spring 31. See FIGS. 10 and 11. As the card continues rearward, guided by the card guides and opening 24 lateral edges, the rounded bottoms 58 of side pieces 54 ride on to the top surface of the card, which continues past gateway wall 36 toward its fully seated or reading position within reader 10.

Figure 10:
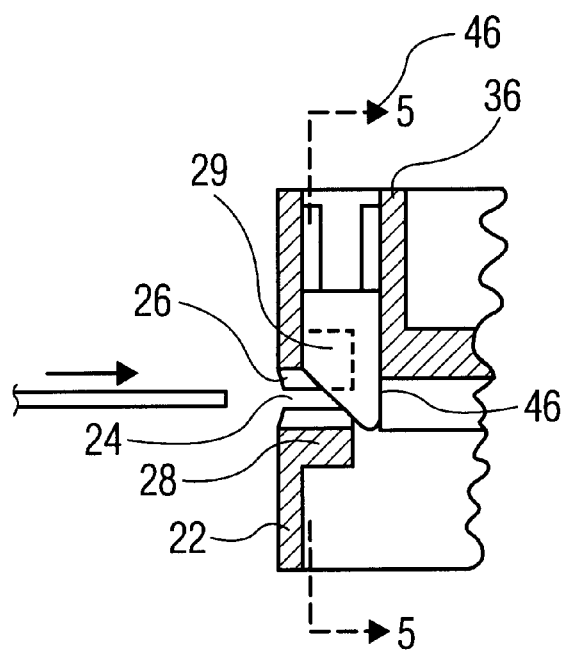
FIG. 10 is similar to FIG. 9 showing the gate member in the closed position and ready to receive a card.
Figure 11:
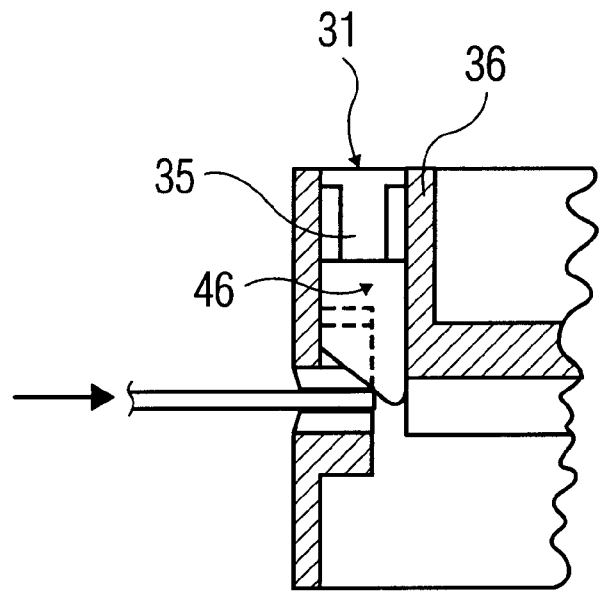
FIG. 11 is similar to FIG. 10 showing the card partially inserted to partially raise the gate member.
Figure 12:
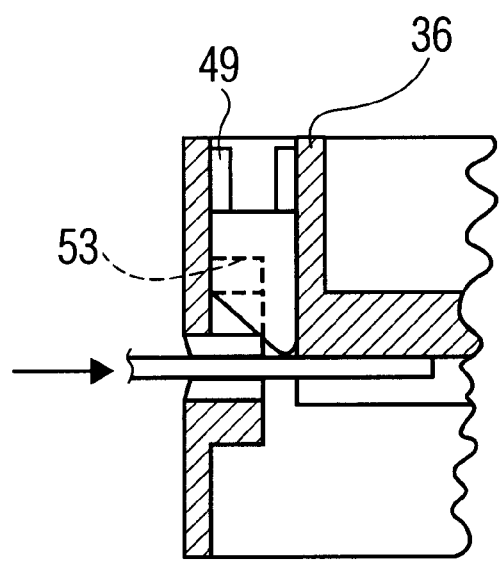
FIG. 12 is similar to FIG. 11 showing the card further inserted into the reader with tits leading edge past the openings 37 and the gate member raised to its fully open position.

After the transaction is completed, the card is manually withdrawn toward the user and as the now trailing edge of the card moves through gateway 47, the gate member cam surface 56 of each side piece rides down the card edge enabling the weight of gate member 46 and spring 31 forces to lower the gate to its closed and resting position shown in FIG. 10.

In the event upon initial insertion, the leading card edge enters opening 24 with an improper horizontal angular orientation, one transverse side portion of the leading card edge will contact its respective cam surface 56 before the other causing the first contacted side of gate member 46 to rise first, thus skewing member 46 in the gateway. Side pieces 54, in response to such action, will bind against the side walls 49 of the gateway thus preventing any further penetration of the card along cam surfaces 56. The user has no option but to withdraw the card from opening 24 which allows gate member 46 to right itself and re-seat surface 53 on shoulders 28 spring 31 aids to right the gate member 46. The gate member 46 is now in its proper closed position and the reader is ready to receive the card leading edge again.

It will be understood that (i) reader 10 can comprise one of a variety of types of card readers, such as smart card, magnetic stripe card, hybrid card, or other type of reader so long as the gate mechanism is responsive to manual insertion of the card, (ii) the apparatus for fully seating and electronically reading the card information within the housing is not shown herein and could comprise any suitable arrangement, (iii) the terms horizontal, transverse, longitudinal, and the like are used in relation to the transaction card and reader regardless of the ultimate application and orientation of the reader itself or the transverse opening 24, (iv) front plate 22 and rear gateway plate 36 can be formed integrally with frame 14 or otherwise mechanically coupled thereto, and (v) the parts and embodiment herein shown are exemplary and may take various equivalent forms to implement the present invention, and (vi) various modification and enhancements can be made to the herein disclosed exemplary embodiment without departing from the spirit and scope of the present invention.

We claim:

1. A transaction card reader including a generally planar manual card insertion path and an interior for seating an inserted card in a reading position comprising:

a frame, a front member coupled to said frame at a position facing the user, said front member defining a transverse card opening for receiving the leading edge of a card as it enters the reader, said front member including elements for guiding the card leading edge into a substantially predetermined insertion position within a plane of the card insertion path, a gate member located inward of said transverse opening for selectively moving between a closed position in which said gate member blocks the said card reading interior from entrance by a transaction card, debris and tamper tools and an open position in which a transaction card can enter the card reader interior, and said gate member being moveable from said closed position toward said open position in response to the inserted card leading edge engaging said gate member and applying manual card leading edge forces to said gate member, guide members coupled to said frame for guiding the movement of said gate member from said closed position toward said open position when the inserted transaction card leading edge forces on said gate member are substantially symmetrically applied and for impeding gate member movement from said closed position when the inserted transaction card leading edge forces on said gate member are not substantially symmetrically applied to said gate member, and wherein said guide members comprise a rear member and two side members for guiding the movement of said gate member in a direction generally perpendicular to said transverse opening and the plane of the card insertion path.

2. A card reader according to claim 1 wherein said rear member comprises a rear plate and said side members comprise side walls forming a gateway to confine and guide the movement of said gate member.

3. A card reader according to claim 2 wherein said gate member includes at least one cam surface facing said opening for providing force to move said gate member toward said open position in response to card insertion leading edge forces when the card leading edge engages said at least one cam surface.

4. A card reader according to claim 3 wherein said gate member comprises at least two cam surfaces each being spaced substantially the same transverse distance from the fore and aft center axis of the gate member.

5. A card reader according to claim 3 wherein a gate support member is coupled to said frame that supports the gate member when the gate member is in the closed position.

6. A card reader according to claim 5 wherein said gate member comprises a resting surface that rests on said support member when in the closed position and a closing position depending from said resting surface for blocking the insertion path inward of said transverse opening when said gate member is in the closed position.

7. A card reader according to claim 5 wherein said gate member comprises at least two cam surfaces each being spaced substantially the same transverse distance from the fore and aft center axis of the gate member.

8. A card reader according to claim 1 wherein
said gate member includes at least one card contacting element having a cam surface facing said transverse opening for providing force to move said gate member toward said open position in response to card insertion leading edge forces when the card leading edge engages said cam surface.

9. A card reader according to claim 8 wherein said gate member includes a bottom and said cam surface extends a distance sufficient to move said bottom fully out of the insertion path of the card in response to the continued insertion of the card inward of the position of said gate member.

10. A card reader according to claim 9 wherein the bottom of the cam surface is formed so that it can contact the top surface of the moving inserted card without damaging the card top surface.

11. A transaction card reader including a generally planar manual card insertion path and an interior for seating an inserted card in a reading position comprising:

a frame, a front member coupled to said frame at a position facing the user, said front member defining a transverse card opening for receiving the leading edge of a card as it enters the reader, said front member including elements for guiding the card leading edge into a substantially predetermined insertion position within a plane of the card insertion path, a gate member located inward of said transverse opening for selectively moving between a closed position in which said gate member blocks the said card reading interior from entrance by a transaction card, debris and tamper tools and an open position in which a transaction card can enter the card reader interior, and said gate member being moveable from said closed position toward said open position in response to the inserted card leading edge engaging said gate member and applying manual card leading edge forces to said gate member, guide members coupled to said frame for guiding the movement of said gate member from said closed position toward said open position when the inserted transaction card leading edge forces on said gate member are substantially symmetrically applied and for impeding gate member movement from said closed position when the inserted transaction card leading edge forces on said gate member are not substantially symmetrically applied to said gate member, and wherein said gate member includes at least one card contacting element having a cam surface facing said transverse opening for providing force to move said gate member toward said open position in response to card insertion leading edge forces when the card leading edge engages said cam surface, and wherein said gate member includes a bottom and said cam surface extends a distance sufficient to move said bottom fully out of the insertion path of the card in response to the continued insertion of the card inward of the position of said gate member and further comprising a spring member positioned to contact and apply increasing force on said gate member directed toward the closed position in response to said gate member movement toward said open position.

12. A card reader according to claim 11 wherein the said cam surface rides down the card inward edge as the card is withdrawn and said spring member applies reduced force on the gate member in the direction of the closed position as the gate member moves toward the closed position.

13. A transaction card reader including a generally planar manual card insertion path and an interior for seating an inserted card in a reading position comprising:

a frame, a front member coupled to said frame at a position facing the user, said front member defining a transverse card opening for receiving the leading edge of a card as it enters the reader, said front member including elements for guiding the card leading edge into a substantially predetermined insertion position within a plane of the card insertion path, a gate member located inward of said transverse opening for selectively moving between a closed position in which said gate member blocks the said card reading interior from entrance by a transaction card, debris and tamper tools and an open position in which a transaction card can enter the card reader interior, and said gate member being moveable from said closed position toward said open position in response to the inserted card leading edge engaging said gate member and applying manual card leading edge forces to said gate member, guide members coupled to said frame for guiding the movement of said gate member from said closed position toward said open position when the inserted transaction card leading edge forces on said gate member are substantially symmetrically applied and for impeding gate member movement from said closed position when the inserted transaction card leading edge forces on said gate member are not substantially symmetrically applied to said sate member, and wherein said gate member is mechanically bias toward the closed position with a force magnitude that increases with the increasing distance of said gate member from the closed position.

14. A card reader according to claim 13 wherein a spring member is coupled to said frame for applying said biasing force to said gate member symmetrically about the fore and aft axis of said gate member.

* * * * *